United States Patent [19]

Anderson et al.

[11] 4,357,493

[45] Nov. 2, 1982

[54] METHOD AND APPARATUS FOR STORING ANNOUNCEMENTS IN A COMMUNICATIONS SYSTEM

[75] Inventors: Thomas W. Anderson, Warrenville, Ill.; Robert V. Jenness, Boca Raton, Fla.; Richard J. Milczarek, Warrenville, Ill.; Edwin M. Schaefer, III, North Aurora, Ill.; Robert M. Stekl, Montgomery, Ill.

[73] Assignee: Bell Telephone Laboratories, Incorporated, Murray Hill, N.J.

[21] Appl. No.: 232,999

[22] Filed: Feb. 9, 1981

[51] Int. Cl.³ .......................................... H04M 11/00
[52] U.S. Cl. ................................. 179/6.04; 179/6.08; 364/900; 360/12; 340/825.25
[58] Field of Search .................. 179/6.04, 6.08, 6.17, 179/1 SM; 369/30, 33, 36, 34, 22, 23, 69; 340/825.55, 825.25, 825.26, 825.27; 364/900; 360/12

[56] References Cited

U.S. PATENT DOCUMENTS

| | | | |
|---|---|---|---|
| 3,253,263 | 5/1966 | Lee | 364/900 |
| 3,296,371 | 1/1967 | Fox | 179/1 SM |
| 3,662,348 | 5/1972 | Weiss | 179/1 SM |
| 4,054,756 | 10/1977 | Comella | 179/18 B |

*Primary Examiner*—Alan Faber
*Attorney, Agent, or Firm*—C. H. Davis

[57] ABSTRACT

A telephone network having a public announcement system is disclosed. Announcements are divided into message segments each of which is stored in a sector of a disc memory. When an announcement is activated, the message segments are loaded into a corresponding number of buffers for transmittal to calling customers. Each buffer will transmit the entire message, but in real time the buffers contain different message segments. Upon request for an announcement, the buffer containing the beginning message segment is selected to minimize holding time and customer waiting.

14 Claims, 10 Drawing Figures

FIG. 8
PHASING TABLE

| | | | | |
|---|---|---|---|---|
| 0 | AVAIL | MATE TSI | TSI TO SPC | CHANNEL |

| | | | | | |
|---|---|---|---|---|---|
| 0 | UNAVAIL | | | | ALT ANN. ID |
| 1 | | | STOP ANN TIME | DUPLEX FAILURE | SIMPLEX |
| 2 | | RETURN 6 SEC. RING | NO ANS ON INC TRK | INF. ANN. | MAX LISTENING TIME |
| 3 | TIME OF LAST PHASE REPORT | | | | |
| 7 | PEG COUNT | | | | |

FIG. 9
ANNOUNCEMENT STATUS TABLE

| STATUS | NUMBER OF SECTORS | PHASE |
|---|---|---|
| NUMBER OF BUFFERS | LINK TO FIRST SECTOR | |
| | LINK TO FIRST PLAYBACK BUFFER | |

FIG. 10
PLAYBACK BUFFER ALLOCATION TABLE

| STATUS | BUFFER SEQUENCE NUMBER | ANN. NO. |
|---|---|---|
| LINK TO NEXT BUFFER | | |

METHOD AND APPARATUS FOR STORING ANNOUNCEMENTS IN A COMMUNICATIONS SYSTEM

TECHNICAL FIELD

This invention relates to communication systems and particularly to systems for storing and distributing announcements individually to a large number of people. In a more particular aspect, this invention relates to telephone systems and particularly to arrangements for transmitting prerecorded messages over a telephone network. In a still more particular aspect, this invention relates to methods and apparatus for storing announcements in a public announcements system to facilitate playback and minimize the waiting time for the connection of each customer to the beginning of a message.

BACKGROUND OF THE INVENTION

The telephone network has long been utilized as a medium for broadcasting messages of general interest to telephone customers. Thus, customers can dial preassigned director numbers to receive recorded messages such as weather reports, stock quotations, the time of day, the scores of sporting events, etc. With public announcement systems, it is essential that each caller receive the entire contents of an announcement. If the announcements are relatively short, such as the time of day or weather reports, the system can be arranged to repeat the announcement several times. Thus, if a caller is connected to the system in the middle of an announcement, the caller merely waits for the announcement to be repeated so that he can hear the message in its entirety. Many of the prior art systems continually repeat the message for a predetermined interval to allow the caller to hear at least one complete announcement, regardless of when a customer is connected to the system.

While these arrangements are wholly suitable for their intended purpose, they tend to lengthen the average holding time of equipment and may aggravate the caller who has to wait for the message to finish before hearing a complete message from its beginning.

SUMMARY OF THE INVENTION

The foregoing problem is solved and a technical advance is achieved by a telephone switching system and a public announcement system which cooperates to connect calling customers expeditiously to the beginning of prerecorded announcements. More specifically, and according to the one illustrative embodiment of the invention, an announcement is divided into a plurality of message segments which are recorded in corresponding portions of a disc store. For example, a 90 second message is divided into three 30-second message segments and stored in the disc memory. Also associated with each announcement are playback buffers equal in number to the number of message segments. Each buffer is loaded continuously from the disc with the entire announcement. However, in real time, each buffer associated with an announcement has a different message segment residing therein. In response to a call over the telephone network for the announcement, that buffer is selected which will first play back the beginning message segment of the announcement.

BRIEF DESCRIPTION OF THE DRAWINGS

FIG. 8 depicts the phasing table found in the switching system memory;

FIG. 9 depicts an announcement status table; and

FIG. 10 shows a typical playback buffer table found in the announcement system memory.

DETAILED DESCRIPTION

Figure 1:
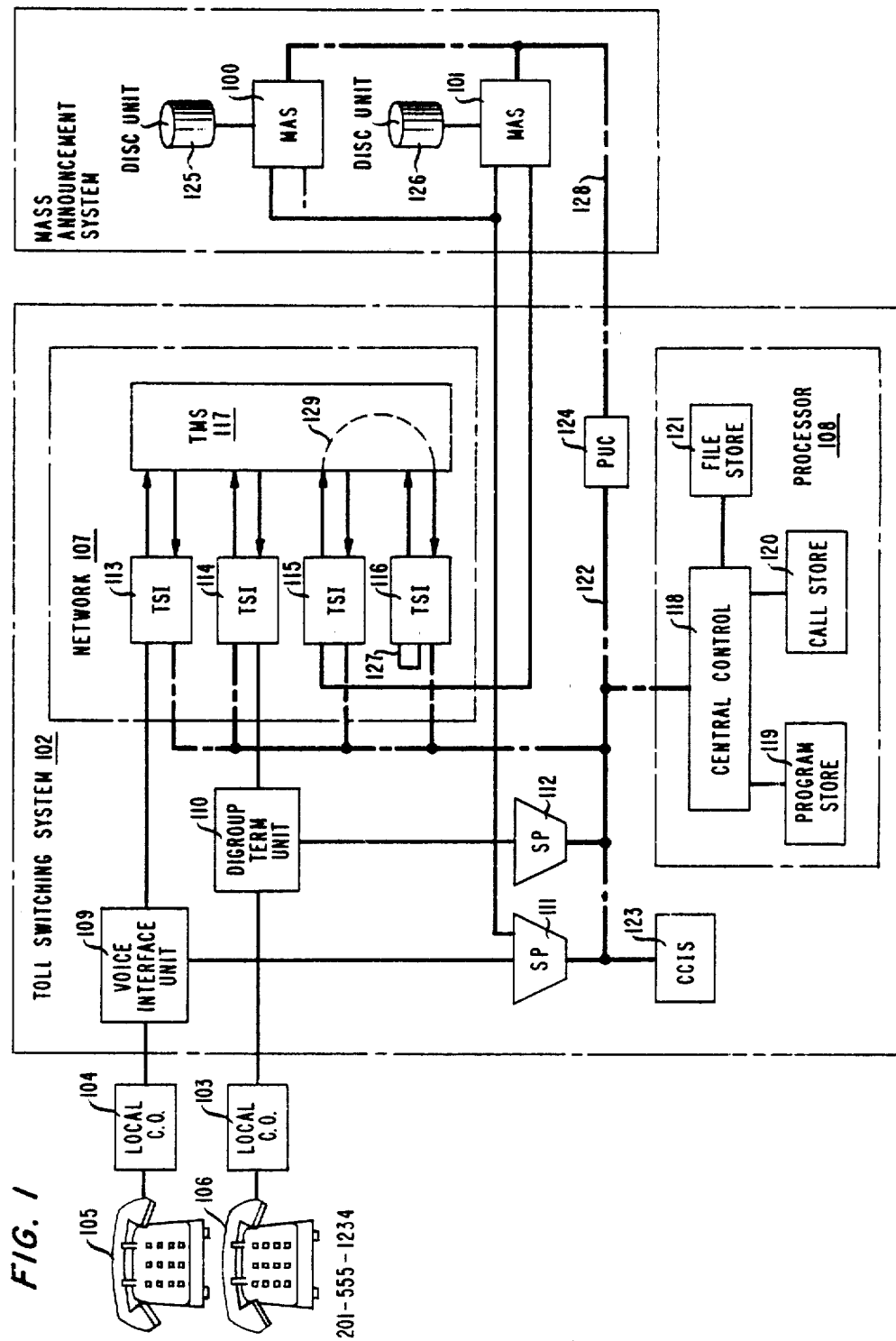
FIG. 1 shows, in block diagram form, a telephone network having a toll switching system equipped with a public announcement system.

The general system organization is illustrated in the block diagram of FIG. 1 which shows a typical communications network having a toll switching system 102 which serves local telephone central offices 103 and 104. Central offices 103 and 104 contain the switching apparatus for providing telephone service to customer stations 105 and 106, respectively. Connected to switching system 102 is a public announcement system comprising mass announcement units MAS 100 and MAS 101. The mass announcement units are used for broadcasting prerecorded messages over the telephone network via the toll and local switching offices.

Toll switching system 102, as depicted in FIG. 1, is a typical electronic switching system such as the No. 4 ESS which is manufactured by Western Electric Company, Incorporated. This switching system is described in detail in *Bell System Technical Journal*, Vol. 56, No. 7, September, 1977, and need not be fully described herein for the reader to understand the present invention.

Switching system 102 comprises a network 107, a processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116 and time multiplex switch (TMS) unit 117.

TMS 117 is a two-stage switch array comprised of solid state crosspoints which provide a multiplicity of unidirectional paths between its input and output. Each network connection through TMS 117 is made in terms of a pair of unidirectional paths in one of the 128 time slots sharing the paths on a repeating basis at an 8KHz rate. The switches are controlled by information contained in time slot memories and this information is placed in the memory by the processor under the control of call processing programs.

The TSI units 113–116 provide the initial time-space and final space-time stages of the network 107. The time slot interchanger receives incoming pulse code modulated samples over analog and digital facilities in a DS-120 format where 120, 8 bit PCM channels are multiplexed with 8 maintenance channels to form a 128 time slot frame. The receiving portion of the time slot interchanger buffers the incoming links to allow synchronization of the data with the network timing and performs the initial time-space switching before transmitting data to the TMS. After passing through the TMS, the data is returnd to the same TSI or another TSI where the final space-to-time conversion is performed. The TSI then reloads the data onto outgoing DS-120 links where it is transmitted to the appropriate analog or digital facility.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 104 is connected to the toll office over the digital facilities which terminate in digroup terminal unit 110, while local office 103 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 is a directed processor under the control of centrol control 118 and provides the scan, distribute, and digit reception tasks for analog trunks. Signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by processor 108. Processor 108 is a data processing facility and can functionally be divided into a central control 118, program store 119, call store 120, file store 121, and other apparatus that has not been shown to simlify the drawing. A typical processor suitable for use in the illustrative toll switching system is described in the *Bell System Technical Journal*, Vol. 56, No. 2, February, 1977.

The program store 119 contains programs that are normally resident in the system while call store 120 contains transient data relating to calls in progress. File store 121 is a source of office data and programs, and store 121 wll retain the data in the event of a power or hardware failure. The file store is also used to replenish program stores that become faulty and lose their data.

Central control 118 is the information processing unit of the system and executes the program instructions resident in program store 119 using the call processing data in call store 120. Central control 118 communicates with the peripheral units including the announcement system via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A description of a typical common channel interoffice signaling system is disclosed in the *Bell System Technical Journal*, Vol. 57, No. 2, dated February, 1978, and is represented herein by CCIS block 123.

Coupled to the toll switching system is a public announcement system comprising two mass announcement units designated MAS 100 and MAS 101. While one two MAS units are shown to simplify the drawing, it will be obvious to the reader that more units can be provided. Each MAS unit has a disc storage unit associated therewith for the storage of announcements to be broadcast over the network. In the illustrative embodiment, the disc units 125 and 126 are each arranged to store up to 40 minutes of announcement information which is stored in 30-second segments in 64 kilobit per second serial PCM data format. Except for phase timing and announcement duplication functions, each MAS unit operates independently. Insofar as a MAS unit is concerned, and in accordance with a feature of the invention, the start of each announcement phase or segment is displaced by 30 seconds in time. However, the two MAS units 100 and 101 together are displaced by 15 seconds in time. The duplication arrangement provides protection in the event of a MAS unit failure, but lengthens the announcement waiting time when one MAS unit fails. Each MAS unit is connected to a serving TSI unit which is connected through the TMS to a dedicated TSI unit. As shown in FIG. 1, MAS unit 101 is connected to the time slot interchange unit 115, and this TSI unit is connected via a nailed up connection 129 to TSI unit 116 which is configured by virtue of its "loop back" 127 to fan out announcements from the MAS unit to other TSIs, thus permitting the simultaneous broadcasting of an announcement to numerous customers. In practive, both MAS units are connected in a similar manner, and each would be connected to duplicate TSIs for reliability, but this has not been shown to simplify the drawing.

Interaction between the MAS units 100 and 101 and the toll switching system processor 108 is via peripheral unit controller PUC 124 and buses 122 and 128. The MAS units are also connected to signal processor 111 for maintenance purposes.

Figure 2:
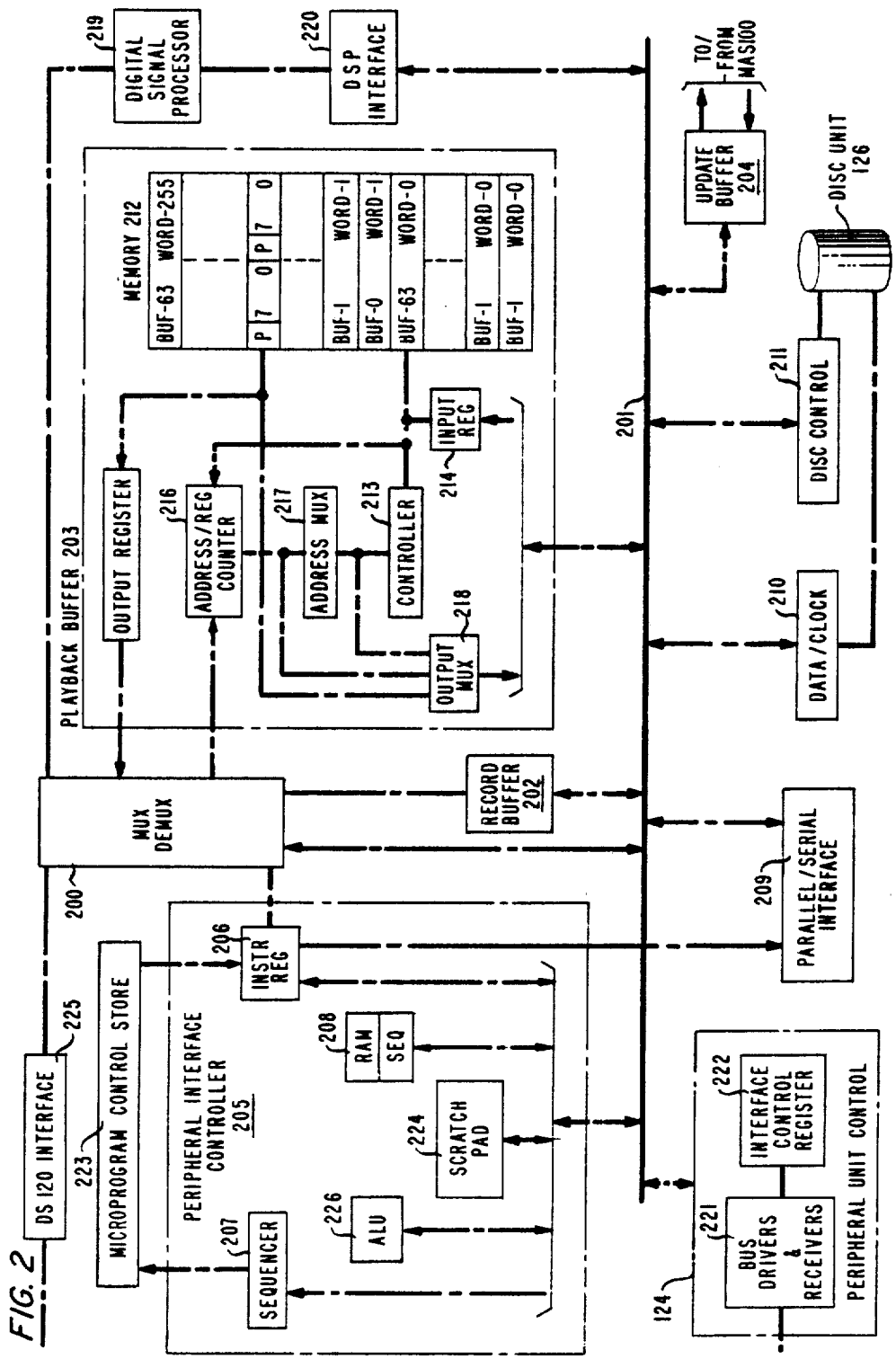
FIG. 2 shows a more detailed block diagram of the public announcement system of FIG. 1.

MAS unit 101 is shown in more detail in the block diagram of FIG. 2. MAS unit 100 is similar and need not be disclosed in detail herein for a full understanding of the invention. MAS unit 101 comprises a data multiplexer/demultiplexer 200, DS120 interface 225, digital signal processor 219, buffers 202–204, program store 223, peripheral interface controller 205, and a moving head disc and related disc interface circuitry 126.

Peripheral interface controller 205 is a high-speed sequencer-driven controller which performs all common arithmetic and logic for control purposes within MAS unit 101. Controller 205 is driven by a firmware program contained in the microprogram control store 223.

Some of the routines performed by controller 205 include the control of all data transferred via internal bus 201, processing orders from the toll switching system processor 108 via peripheral unit control 124, phasing announcements and generating reports associated therewith, controlling the reading of the mate MAS 100 update buffer during an update process, controlling the moving head disc, etc.

Periodically, the sequencer 207 in controller 205 generates an address to read a work from store 223. This word is read into an instruction register 206 in the controller which executes the instruction. Controller 205 also contains interrupt control logic, a scratch pad register 224, and a random access memory 208.

The RAM 208 provides storage for variable status, control and error information as well as a scratch pad memory for transient data. Some types of information found in the RAM are the temporary storage of disc read/write data, buffer and sector allocation tables of announcements, announcement start and stop data, pointer tables, status and control data, read/write pointers associated with the switching system processor, etc.

MAS 101 contains a bidirectional internal bus 201 which provides the means of communication between the circuits shown in FIG. 2. Data is transferred to and from the bus as addressed by the source and destination codes supplied by instruction register 206.

Sequencer 207 provides the normal sequential program addresses as well as conditional and unconditional branch addresses under direction of function bits contained in register 206.

Announcement storage is provided by moving head disc 126. In the illustrative embodiment, a disc storage unit 126 provides a high-speed random access digital data storage device. The unit employs a disc pack having at least three discs resulting in six storage surfaces. Five of the surfaces are used for storage of announcements, while the sixth is a prerecorded servo and clock surface.

Figures 3, 4:
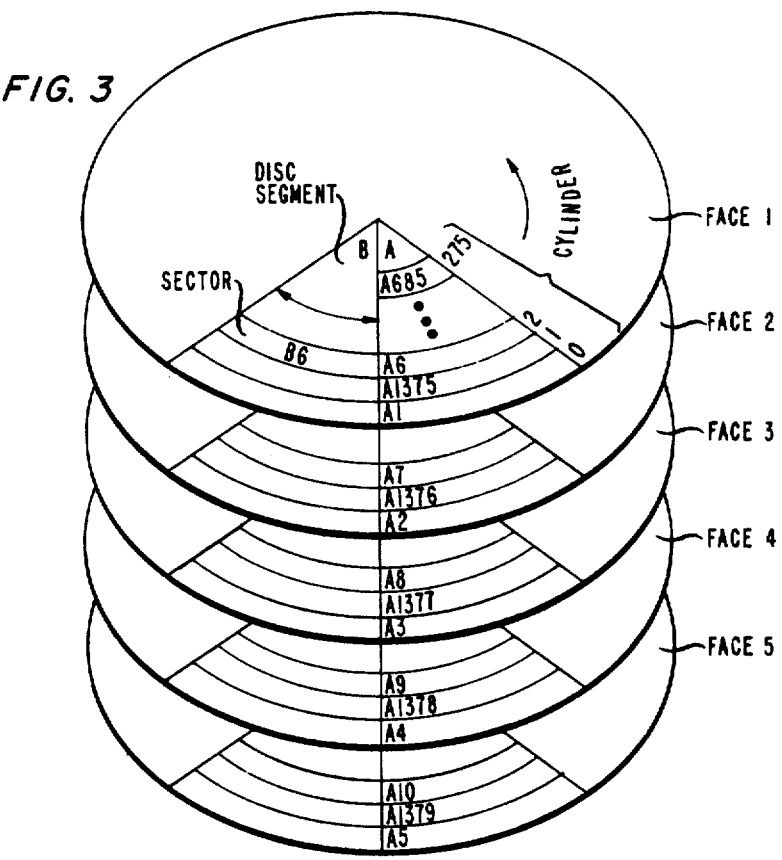
FIG. 3 depicts the disc memory layout for announcements stored in the public announcement system.
FIG. 4 depicts a timing diagram of the several segments of an announcement and how they are phased within the duplicated announcement system.

The announcements are stored in the manner depicted in FIG. 3 so that a minimum waiting time is experienced before a complete message is available for playback. More specifically, each disc face is divided into annular tracks to which 276 will be used for announcement storage. The annular tracks of all five faces are aligned one above the other and when taken together, form a cylinder. Each track is further divided into 86 sectors. Six are reserved for maintenance, a maximum of 59 can be activated for announcements to be played back, and the remaining 21 are available for standby announcements or recording prior to activation of playback. The contents of all active tracks on all faces of a disc segment comprise one 30-second segment of a message. The disc segments are designated A-, B-, etc., in FIG. 3.

A sector, which comprises a single arc portion of a rack on one face, such as B6 in FIG. 3, contains 1/1380th of a digitized message segment. The sector contains a preamble which is written to all zeroes to allow the read circuitry to stabilize in order to detect the next two sync words written in the sector. Following the sync words are the address in terms of the sector number, head number, and cylinder number. Following the address are 87 words of digitized voice data and an error correction code. The end of the sector B6 is filled with all zeroes to form a postamble.

The disc drive contains five data heads, one for each data face with one data head being activated at a time. The entire disc is scanned in 30-second cycles, first by accessing all active sectors on track 0 (the outermost track) of each active face in succession (i.e., the scan of one cylinder). The heads are then moved into cylinder 2, and the process is repeated for all even-numbered cylinders until the innermost active cylinder is reached. The direction of head motion is then reversed to scan the odd-numbered cylinders while the heads return to the outer rim. This permits the disc to be read with a minimum seek time between tracks.

Thus, with the above arrangement, each MAS unit is always no more than 30 seconds away from the beginning of a message segment. The storage of announcements in the MAS units 100 and 101, however, are offset in time by 15 seconds so that insofar as the total switching system is concerned, the beginning of a message segment is available within 15 seconds, depending on which buffer in which MAS unit is selected.

The peripheral interface controller 205, along with interface 209, clock 210, and disc control 211 perform all transfers of data from the disc to the buffers and vice versa. Data is transferred on a per-sector basis; that is, all sectors A on the disc have a part of the same message, all sectors B have another message, etc.

The type of data transfer is specified by a status word for each sector. This status word contains the type of transfer that is to be done on that particular sector along with information needed to perform the transfer, such as the buffer identity.

The status words reside in RAM 208 in a sector buffer table which is read at the beginning of each sector access time. There are three basic sector jobs: read, write and idle. Read and write jobs can be further divided into specific tasks as to where the data to and from the disc is written to or read from. Data read from the disc may either go to RAM 208, playback buffer 203 and/or update buffer 204. Data written on the disc may come from RAM 208, record buffer 202, update buffer 204 or the update buffer of the mate MAS 100.

As mentioned above, the discs are scanned by moving the heads first over the even-numbered tracks in one direction and then back over the odd-numbered tracks. During the time that the heads are moving (seeking) from one cylinder to the next, controller 205 is free to execute other tasks called "seek" tasks. Also in the illustrative embodiment, since the disc transfer rate is higher than that of the buffers, disc accessing must be suspended periodically so that the buffers do not overflow. These suspensions can occur after any track has been read except during a seek task. When disc access is suspended, controller 205 is free to execute other tasks called "slip" tasks.

Thus, the data transfer rate to and from the disc unit and the processor capacity is sufficient to service the record and playback buffers 202 and 203, respectively, and still allow time for controller 205 to execute peripheral orders, file reports with the switching system processor 108, perform diagnostics, etc.

During each 30-second disc scan, the assignment tables that are used to map the disc sectors to the buffers are permuted to cause 30-second strips to be linked to the buffers, thereby providing variable message lengths. In this illustrative embodiment, messages can be provided up to five minutes long in 30-second segments.

The assignment tables are located in the RAM of controller 205, and FIG. 4 illustrates how the buffers are assigned for a 90-second message. The message is divided into three 30-second segments or phases (designated A, B, and C in FIG. 4) for each of the MAS units 100 and 101. A playback timing report is filed with the toll switching system processor 108 at the start of each announcement phase A. This report identifies the announcement and the playback buffer where the message starts. Thus, if a request for an announcement occurs anytime during the 150-second interval shown in FIG. 4, processor 108 can select the MAS unit and buffer which contains the beginning of the message, and the customer will not have to wait longer than 15 seconds for the message to begin.

Disc unit 126 is under control of data/clock 210, disc control 211, and interface 209. Disc control 211 comprises a plurality of registers which are set by peripheral interface controller 205 to control the read/write heads and to select the cylinder and head addresses in addition to monitoring the status of the disc unit. Interface 209 provides the circuitry for controller 205 to transfer data to and from the disc unit 126. Interface 209 contains a first-in-first-out (FIFO) memory under control of a disc read/write sequencer. During a disc write, the interface performs parallel-to-serial data conversion, computes an error detection check sum, and checks the data parity as the data is clocked to the disc by a servo clock which responds to the reading of the disc servo face mentioned above. The error detection check sum protects information in the disc store while parity is used to protect the internal bus. During a disc read, the interface 209 performs serial-to-parallel data conversion and also performs an error check. The serially read data is assembled into FIFO memory.

As shown in FIG. 2, each MAS unit includes record, playback, and update buffers 202, 203, and 204, respectively. The playback buffer 203 functions as a temporary store for the PCM announcement data read from the disc unit and continuously transmitted to the TSI unit over the DS120 channels assigned to playback. In the illustrative embodiment, the buffer consists of a random access memory 212 organized in 64 buffers of 256 words each, interleaved as shown in FIG. 2. Each buffer word consists of two 8-bit bytes (DS120 words) plus a parity bit for each byte. The words are accessed by reading each 64-word data block twice, with alternate bytes selected by multiplexer 200. Therefore, each 64-word block provides two frames of playback data.

The record buffer 202 in FIG. 2 is a similar type memory for temporarily storing 8-bit PCM data from the TSI unit prior to recording the data on the allocated disc sector. Operation of the record buffer is similar to the playback buffer. The input data from the DS120 interface is written into the record buffer in synchronism with the playback buffer read process. The record buffer consists of 16 memory buffers of 256 words each interleaved in the same manner as the playback buffer shown in FIG. 2.

As mentioned above, the DS120 format consists of a serial bitstream at a rate of 8000 frames per second with 128 time slots (i.e., channels) per frame. Each time slot contains one 8-bit PCM data sample. Of the 128 time slots, 120 may be used for voice information, and 8 are reserved for maintenance data.

The interface between the TSI unit 115 and the record and playback buffers is via DS120 interface 225 and data multiplexer/demultiplexer 200. The incoming serial bitstream from TSI 115 is converted to parallel and demultiplexed to separate the record channels from the unused channels. A signal is also extracted from the bitstream to synchronize the clock in MAS unit 101 and to detect and establish the DS120 word and frame synchronization. The last bit in all but the last channel is uncomplemented to establish word synchronization while the fifth bit in the last channel establishes frame synchronization. Data multiplexer/demultiplexer 200 includes a counter which is incremented for each word to generate addresses for all read/write operations controlled by the DS120 interface.

Each of the MAS units 100 and 101 also contains an update buffer, such as buffer 204 in FIG. 2, which cross-couples data and control signals between the two MAS units. Announcements are always initially recorded completely on one disc and then transferred via the local update buffer to the mate disc unit. This can be done without disturbing the normal playback process of either unit. Interunit timing signals are also exchanged between the two MAS units to provide a phase boundary signal between the two units which establishes at start-up and verify during processing the 15-second offset. The update buffer is used to compensate for the offset between the two MAS units allowing each to write the data onto its own disc in synchronism with its own playback process.

The tables used to control the peripheral interface controller are stored in a protected area of RAM 208. These tables contain all status information of announcements, buffers, and sectors.

For example, an announcement status table is provided to store the status of the announcement including other information such as the number of sectors and playback buffers allocated to the announcement, the phase of the announcement, links to the first sector and buffer, etc. The state of the announcement is indicated in the table as idle, standby, active or update-active. An idle state indicates that a full set of buffers has not been allocated. Once the buffers are allocated, the status is changed to standby and after the sectors have been allocated the status is changed to active. If two sets of sectors exist, e.g., when a standby copy of an announcement exists, the announcement status is marked as update-active. The announcement status table also indicates which sector is playing in the first allocated buffer. This table is accessed by the announcement number received from central control 118 and a typical example of the table is shown in FIG. 9.

Other tables in RAM 208 include the buffer and sector allocation tables and the start point table. The buffer allocation table (See FIG. 10) contains the status of all playback, record and update buffers. The entry for each playback buffer contains an indication as to which announcement the buffer is allocated to and a sequence number indicating the relative portion of the buffer entry in the announcement to which the buffer is assigned. The entry also contains a link to the next buffer in the set of buffers allocated to the announcement.

The sector status table contains information similar to the buffer status table described above.

The start point table contains the starting point for each announcement and is used to decide when each announcement is to be processed, i.e., changing the assignment of disc sectors to buffers. The starting point of an announcement is assigned when an announcement is first recorded since the heads may be in position over any one of the 276 cylinders and recording on any one of the five faces at this time. As will be described below, this table is accessed during seeks, and the information is transmitted to central control 118 via the peripheral unit control. Subsequently, when a customer places a call for a particular announcement, the information is retrieved to connect the customer to the buffer containing the beginning message segment.

As mentioned above, the bulk of the operating time of peripheral interface controller 205 is utilized in the transfer of data between the buffers 202-204 and disc unit 126. The program controlling the peripheral interface controller 205 resides in PROM 223 and can be functionally divided into initialization, operating system, operational tasks and self-testing and diagnostics.

The self-testing and diagnostics need not be considered herein for a complete understanding of the invention.

Although the initialization portion of the program need not be considered in detail, it will be understood that the initialization process includes basic sanity tests and the initialization of various hardware elements in memory and control plus a reset of the program address to zero.

Insofar as the operating system is concerned, the disc data handler routine functions as an executive control and data mover between the disc and buffer memories. Executive control is achieved by passing control to operational and other tasks when data transfer is not required, such as during seeks, slips, idle sectors or sectors that are dedicated.

Operational orders are only executed during seeks or idle and dedicated sectors. For example, and in accordance with a feature of our invention, during every fourth cylinder a seek dispenser routine passes control to the message timing task which performs announcement phasing and concatenation of 30 second segments of messages for the playback, record and update buffers 202-204. This task processes information in the announcement status, buffer allocation, sector allocation and message start point tables to determine the next state of the sector buffer table which controls the disc data handler program. An announcement is processed only if the announcement start point table matches the current start point which is measured from cylinder 0.

Thus, at the end of the message timing task, the above-mentioned tables are updated to indicate in real time which phase of each announcement is playing in each buffer. This information is made available to the toll switching system processor 108 via the peripheral unit control 124. Peripheral unit control 124 transfers a buffer report received from the MAS unit, and it contains the DS120 channel and the announcement number that is phasing.

In other words, when the message timing task is executed by the peripheral interface controller 205 on every fourth cylinder of the disc during each 30 second scan, the controller 205 determines if a particular announcement is phasing, i.e., a start point has just been reached. The report is then sent to the peripheral unit controller 124 which acts as a buffer between MAS 101 and processor 108.

Processor 108 utilizes this report to update a mass announcement phasing table in call store 120. A typical mass announcement phasing table is illustrated in FIG. 8, and this table is accessed by central control 118 during call processing and permits central control 118 to select the DS120 channel which is currently playing back the beginning message segment of messages longer than 30 seconds.

There are two layouts for word 0 as shown in FIG. 8. The upper layout is applicable when the announcement is available and contains the channel field identity which tells the processor the trunk appearance number on the dedicated time slot interchange for the playback segment which phased last. This word also contains the identity of the mate time slot interchange unit as well as other information. If the announcement is unavailable, the alternate format for word 0 is applicable and this contains the identity of the alternate announcement.

Words 1 through 7 contain information as to whether the MAS system is simplex or duplex, whether the announcement has a maximum listening time or can be listened to indefinitely, the time of the last phasing report, the time the announcement should be stopped, miscellaneous peg counts, etc.

Insofar as the "stop" entry is concerned, this entry does not take an announcement out of service immediately. A timer is started by central control 118 and all new calls are routed to a standby announcement. The timer allows calls in progress to finish listening to the announcements they are connected to.

During preselected cylinders, the cross MAS unit timing bit is administered to verify the 15 second phase difference between the MAS units 100 and 101.

Also, during idle sectors, an order execution routine is run. This routine reads the receive queue and performs the order routine specified by the operational code in the queue. Typical orders include (1) allocate or deallocate buffers or sectors, (2) record, monitor, playback or stop playback of an announcement, and (3) abort a recording. Upon complete execution of an operational order, control is passed back to the disc data handler routine.

As mentioned above the disc data handler routine functions both as an executive control and data mover routine. The disc data handler is made up of several subroutines such as (1) lock on track, (2) seek/slip executive, (3) head select, (4) one track data handler (5) error correction and diagnostics and (6) other miscellaneous subroutines.

The lock on track is used to enter the data handler from seek, slip or a unit initialization task. This routine initializes and locks the disc controller onto the track to be accessed. Control is then passed to the one track data handler routine which controls the transfer of data to and from the disc.

Figure 7:
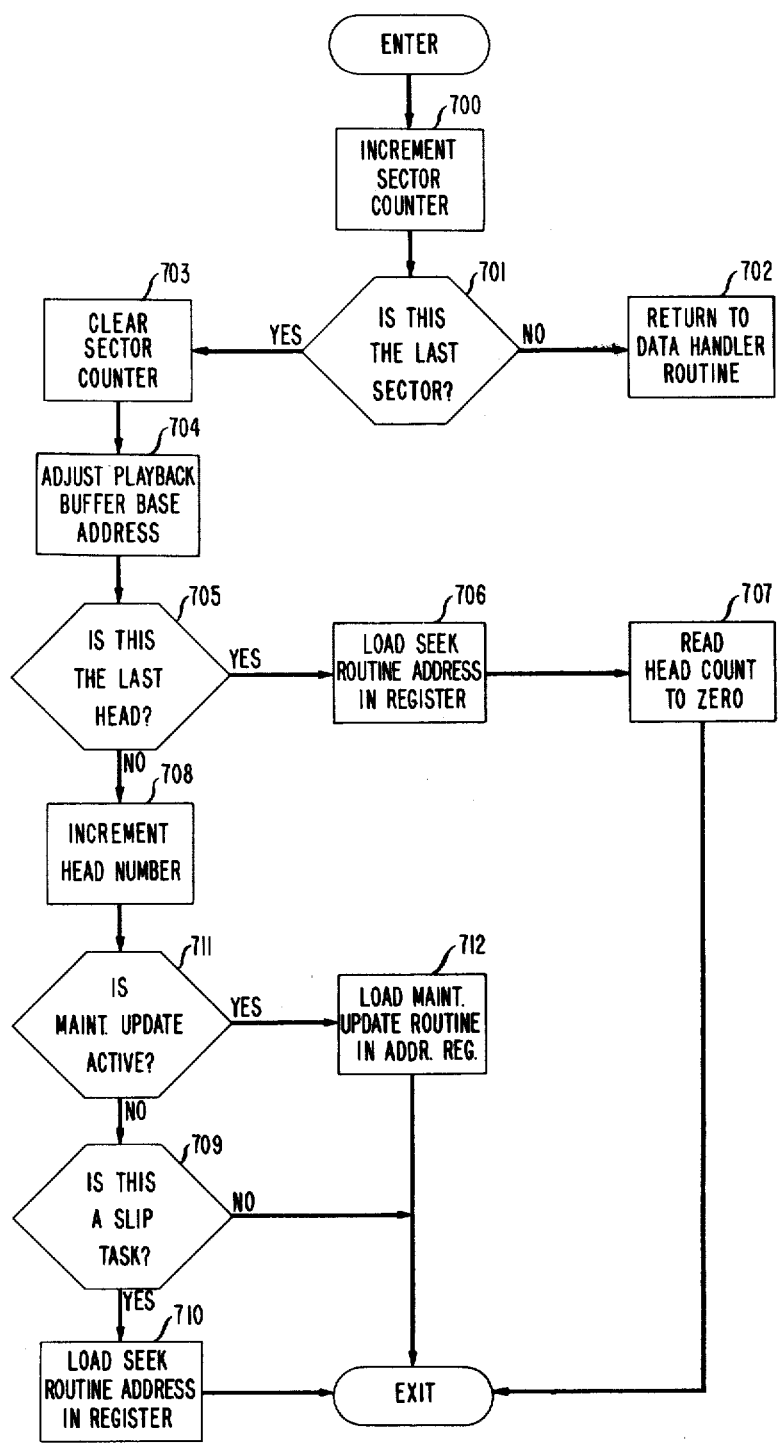
FIG. 7 is a flow diagram of the sequence of operations for selecting read and write heads in the disc memory.

The head select routine is called every sector whether or not a new head is to be selected. The flow diagram of a typical head select routine is shown in FIG. 7. A check is first made to determine if this is the last sector on the track. If this is not the last sector the program returns to the disc data handler routine as shown in box 702. When the last sector of a track is reached the sector counter is reset to zero and the playback buffer current base address is incremented. As shown in boxes 705-710, a determination is made as to whether this is the last head. If this is the last head, a transfer is made to a seek job; but if this is not a last head, the head counter is incremented, and the processor can perform a slip task if one is necessary.

Figure 5:
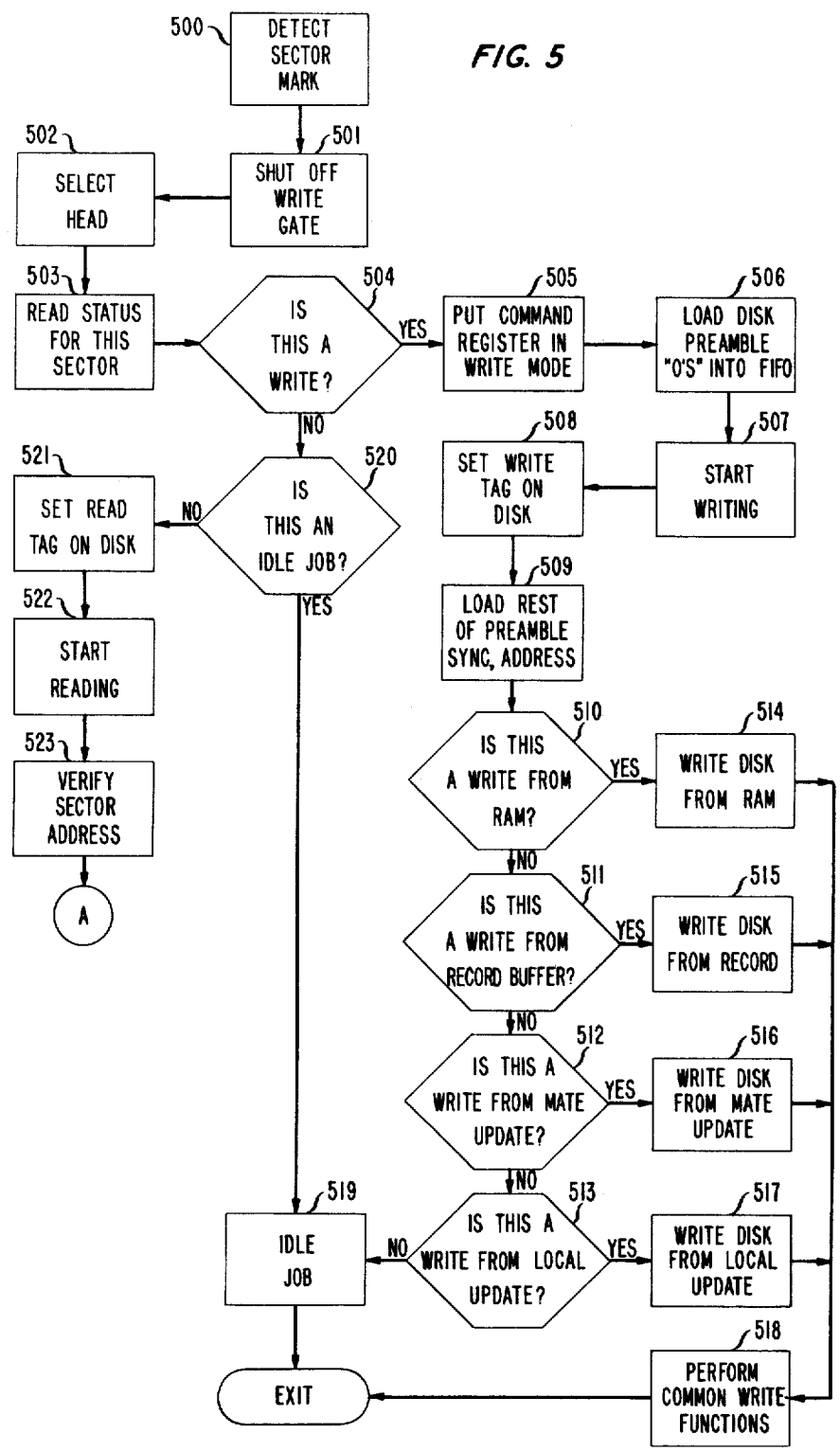
FIGS. 5 and 6 depict a flow diagram of the sequence of operations of the announcement system for handling data to and from the disc memory.
Figure 6:
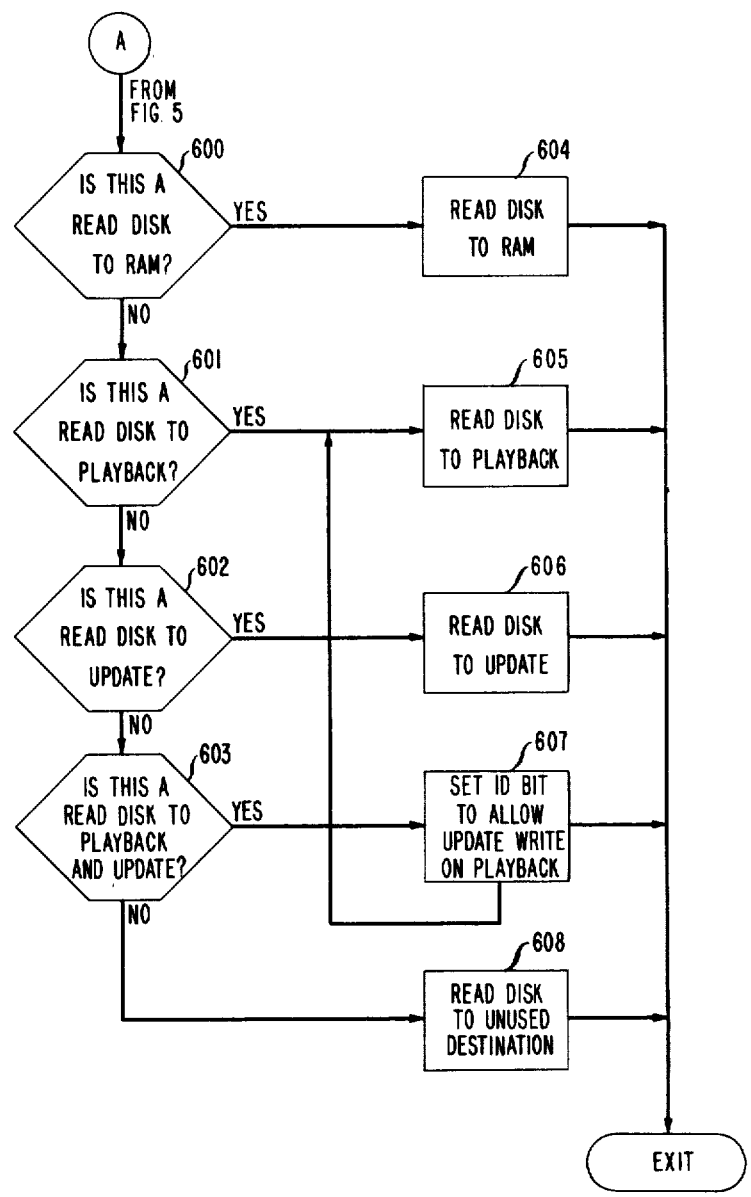

The one track data handler routine is shown in FIGS. 5 and 6 and handles all data transfers for one cylinder. It decides what type of read or write job is to be done and manages all disc location parameters such as sector and head addresses.

The routine starts when a sector mark is detected (box 500) via the reading of a register in disc control 211. Upon detecting the mark, the write gate is turned off, and head select is performed. The proper head has been determined previously by the routine shown in FIG. 7. The status word for the sector is read from the status buffer table in RAM 208 to determine whether this is a read or write task and where the information is going to and coming from.

If this is a write job, the controller 205 sets the command register and then begins the preamble function by loading the FIFO memory in interface 209 with zeroes as shown in boxes 505-507. The controller also sets the write tag on the disc drive to begin the writing on the disc of the preamble, sync character and sector address, and then proceeds to determine whether the information is to be written from the update buffer, record buffer or RAM 208 as set forth in boxes 510–518.

If a sector is idle, the idle task dispenser is examined, and the idle task performed. If the job is a read job, the read tag on the disc drive is set, and a decision is made as to whether the disc should be read into the playback buffer and/or the update buffer or into the RAM as shown in boxes 520–523 in FIG. 5 and 600–608, as shown in FIG. 6.

Thus, it can be seen from the above description that a public announcement system is provided with a disc memory for storing messages to be recorded and played back over a telephone network. The messages are advantageously divided into segments of 30 seconds duration wherein each segment is recorded in digital format on a sector of the disc memory. Dynamically associated with the sectors are buffers which in turn are connected via a time slot interchange unit to calling customers. The public announcement system is program controlled to keep real time account of which message segments are assigned to the buffers for playback and this information is reported to the switching system processor enabling the processor to connect each incoming request for an announcement to the beginning of the announcement without undue delay. The announcement systems can be duplicated for additional reliability and if a duplex system is provided, the announcements in the two units are staggered by 15 seconds to further shorten the waiting time for the start of an announcement. Synchronization is checked between the duplicate units by the periodic exchange of signals.

What is claimed is:

1. For use in a communications system having customer stations, an announcement system and switching means for interconnecting said announcement system over communication channels to said stations for transmitting prerecorded messages to said stations;

said announcement system comprising a message store wherein segments of a particular message are stored in discrete sectors of said store for transmittal in a predetermined sequence during adjacent time intervals to reproduce said message, a plurality of buffers associated with said particular message and each buffer adapted to transmit said particular message over one of said channels wherein the number of buffers equals the number of message segments of said particular message, and means for loading the message segments of said particular message into first and second ones of said buffers, wherein said first and second buffers contain different message segments during a designated time period; and said switching system comprising means responsive to a request from one of said stations for the reproduction of said particular message for selecting one of said first or second buffers according to the particular message segment currently loaded therein.

2. The invention set forth in claim 1 wherein said store comprises a plurality of rotating memory discs and wherein each sector comprises a corresponding portion of all said discs.

3. The invention set forth in claim 1 wherein said announcement system comprises a random access memory for storing the identity of the beginning segment and an indication of the order of message segments in said sequence for said particular message.

4. The invention set forth in claim 3 wherein is also provided means for indicating to said switching system the identity of the first or second buffer containing the beginning message segment.

5. The invention set forth in claim 1 wherein said store comprises a plurality of rotating discs each having a plurality of concentric memory tracks, wherein each sector comprises a corresponding portion of all tracks on all said discs, and wherein said loading means comprises means for selectively transferring message segments stored in individual ones of said track portions of a designated sector to one of said buffers.

6. The invention set forth in claim 1 wherein said message store comprises at least two autonomous memory units each operative to store all segments of said particular message, and wherein said announcement system also comprises means for recording a designated one of said message segments in a sector of a first one of said units and means operative at a predetermined interval subsequent to said recording in said first unit for recording said designated segment in a corresponding sector of said other unit.

7. For use in a telephone network having equipment for storing messages for transmittal over the network and a switching office for selectively interconnecting telephone stations with said equipment, a method for recording and playing back said messages comprising the steps of storing segments of a particular received message in discrete sectors of a memory, activating the particular message for playback by sequentially loading all segments of the particular message into each of a plurality of buffers so that each buffer in real time contains a different segment of the particular message, and, connecting the station to a particular one of the buffers according to the message segment contained therein in response to a request from a station for playback of the message.

8. The method set forth in claim 7 wherein the step of storing the particular message includes the step of identifying the beginning segment of the particular message, identifying the sequence in which all message segments are received and registering the identities in a memory.

9. The method set forth in claim 8 wherein the step of loading a buffer includes the step of transferring the message segments from said memory to a designated buffer in accordance with the identities stored in the memory.

10. The method set forth in claim 7 also including the step of informing the switching office of the buffer identity containing the beginning segment of the particular message.

11. For use in a communications system having customer stations and announcement system and switching means for interconnecting said announcement system over communication channels to said stations for transmitting prerecorded messages to said stations;

said announcement system comprising a plurality of message stores wherein segments of a particular message are stored in discrete sectors of each of said stores for transmittal in a predetermined sequence during adjacent time intervals to reproduce said message, a group of buffers associated with each said store and each buffer group including a plurality of buffers associated with said particular message, each buffer being adapted to transmit said particular message over one of said channels wherein the number of buffers of each said group equals the number of message segments of said particular message, means operative during a first time period for loading the message segments of said particular message into first and second buffers of said first group and operative during a second time period for loading the message segments of said particular message into the first and second buffers of said second group wherein the first and second buffers of a said group contain different message segments in real time, and said switching means comprising means responsive to a request from one of said stations for the reproduction of said particular announcement for selecting one of said buffers according to the message segment currently loaded therein.

12. The invention set forth in claim 11 wherein said announcement system also comprises means for periodically determining the time interval between said first and second time periods.

13. The invention set forth in claim 11 wherein said announcement system comprises a memory indicating the sectors of a said message store which contain the first segment and a subsequent segment of the sequence of message segments associated with said particular message and means for periodically transmitting the contents of said memory to said switching means, and said switching means comprising means for registering said contents to control said selecting means.

14. For use in a telephone network having announcement equipment for storing messages and a switching office for selectively interconnecting customer stations with said equipment, a method for recording and playing back said messages comprising the steps of dividing a designated message received for recording into a plurality of message segments, storing the segments in a corresponding number of sectors of a memory, activating the designated message for playback by continually transferring the contents of the sectors into a plurality of buffers so that each buffer will receive all message segments over a period of time equal to the length of the designated message and so that each buffer in real time contains a different segment of the particular message, selecting the buffer containing the beginning segment of the designated message in response to a request from a calling station for playback of the designated message, and coupling the calling station to the selected buffer for the length of the designated message.

* * * * *

UNITED STATES PATENT AND TRADEMARK OFFICE
CERTIFICATE OF CORRECTION

PATENT NO. : 4,357,493

DATED : November 2, 1982

INVENTOR(S) : Thomas W. Anderson, Robert V. Jennes, Richard J. Milczarek, Edwin M. Schaefer, III, and Robert M Stekl It is certified that error appears in the above—identified patent and that said Letters Patent is hereby corrected as shown below:

Column 1, line 16, "announcements" should read --announcement--; line 38 "heat" should read --hear--. Column 3, line 6, "returnd" should read --returned--; line 30, "centrol" should read --central--. Column 4, line 6, "one" should read --only--. Column 5, line 45, "rack" should read --track--.

Signed and Sealed this

Twenty-second Day of March 1983

[SEAL]

Attest:

GERALD J. MOSSINGHOFF

Attesting Officer     Commissioner of Patents and Trademarks